United States Patent [19]
Mason et al.

[11] 3,714,549
[45] Jan. 30, 1973

[54] TEMPERATURE COMPENSATION CIRCUIT FOR A REGULATED POWER SUPPLY

[75] Inventors: Edwin E. Mason, Harrisburg; Ross C. Libby, West Jefferson, both of Ohio

[73] Assignee: Design Elements, Inc.

[22] Filed: April 20, 1972

[21] Appl. No.: 245,768

[52] U.S. Cl. ................................323/22 T, 323/38
[51] Int. Cl. ...........................................G05f 1/58
[58] Field of Search..........307/297; 323/16, 19, 22 T, 323/38, 68

[56] References Cited

UNITED STATES PATENTS

| | | | |
|---|---|---|---|
| 3,025,451 | 3/1962 | Hakimoelu | 323/22 T |
| 3,681,623 | 8/1972 | Hoffman, Jr. et al. | 323/22 T |

*Primary Examiner*—A. D. Pellinen
*Attorney*—Anthony D. Cennamo et al.

[57] ABSTRACT

A temperature compensation circuit for stabilizing the output voltage of a regulated power supply. The regulator includes an output-shunting zener diode and a feedback transistor for controlling the regulator. The compensation circuit has a Darlington pair connected to the feedback transistor to form a differential amplifier. An adjustable voltage divider, connected across the regulated output, maintains a constant voltage on the input of the Darlington pair.

7 Claims, 2 Drawing Figures

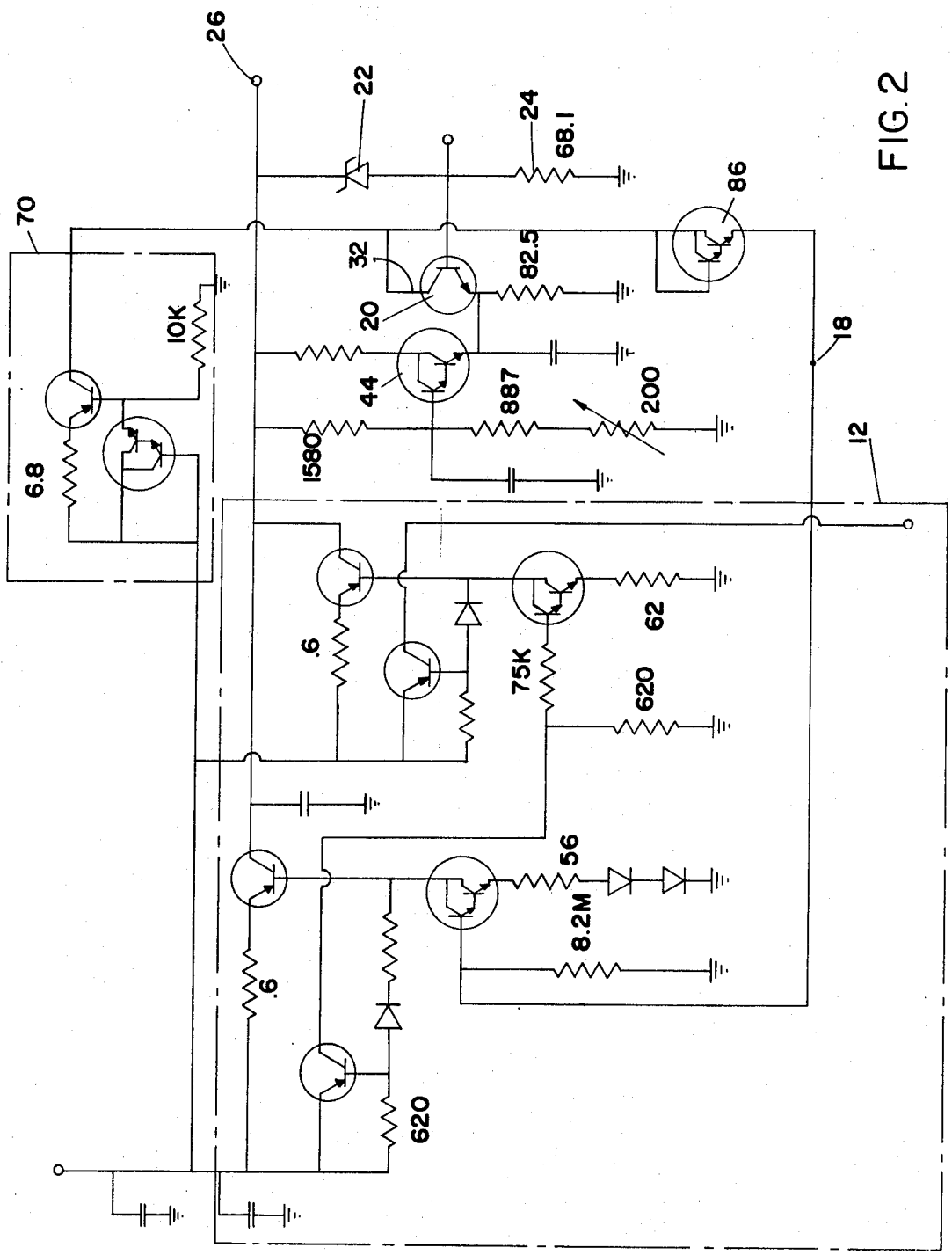

3,714,549

TEMPERATURE COMPENSATION CIRCUIT FOR A REGULATED POWER SUPPLY

BACKGROUND OF THE INVENTION

This invention relates generally to temperature compensation circuits and more particularly relates to a temperature compensation circuit for a regulated power supply.

It is well known that, for a variety of applications, the output voltage level of a dc power supply must be maintained within close tolerances of a nominal value. This is primarily accomplished by using a regulator circuit which utilizes a feedback principle. In such a circuit, the output voltage is continuously monitored and slight changes, due to varying load conditions, in turn cause changes in the conduction of a regulating element to maintain the output voltage at a nearly constant level.

However, such regulating circuits are sensitive to temperature changes. Temperature changes cause variations in the operating characteristics of semiconductor devices. These changes in the semiconductor devices may appear to the regulator as changes in power supply output and thereby cause the regulator to erroneously modify the output away from the nominal value.

There is therefore a need for a temperature compensation circuit which can sense changes in temperature and modify the operation of the regulator circuit to cancel the effects of such temperature changes.

SUMMARY OF THE INVENTION

The invention is a temperature compensation circuit for use in a regulated power supply of the type having a series zener diode and first resistance shunted across its regulated output. Such a regulator has a regulator feedback transistor with its input control terminal connected between the zener diode and the first resistance. The compensation circuit comprises a voltage reference resistance connected between an output of the feedback transistor and the end of the first resistance opposite the zener diode. A plurality of Darlington connected transistors have their outputs connected to the reference resistance and the regulated power supply for supplying temperature controlled current through the reference resistance. A plurality of series connected voltage dividing resistances are connected across the regulated supply and have the input terminal of the Darlington connected transistors connected to a node thereof.

It is an object of the invention to provide an improved regulated power supply.

Another object of the invention is to provide an improved regulated power supply having circuitry for cancelling the effects of temperature-induced changes in the characteristics of the semiconductor devices.

Another object of the invention is to provide a temperature compensation circuit having a manually variable resistance which controls the output level of the regulated power supply.

Further objects and features of the invention will be apparent from the following specification and claims when considered in connection with the accompanying drawings illustrating the preferred embodiment of the invention.

DESCRIPTION OF THE DRAWINGS

FIG. 2 is a schematic diagram of a regulator which embodys the temperature compensation circuit of the present invention.

Figure 1:
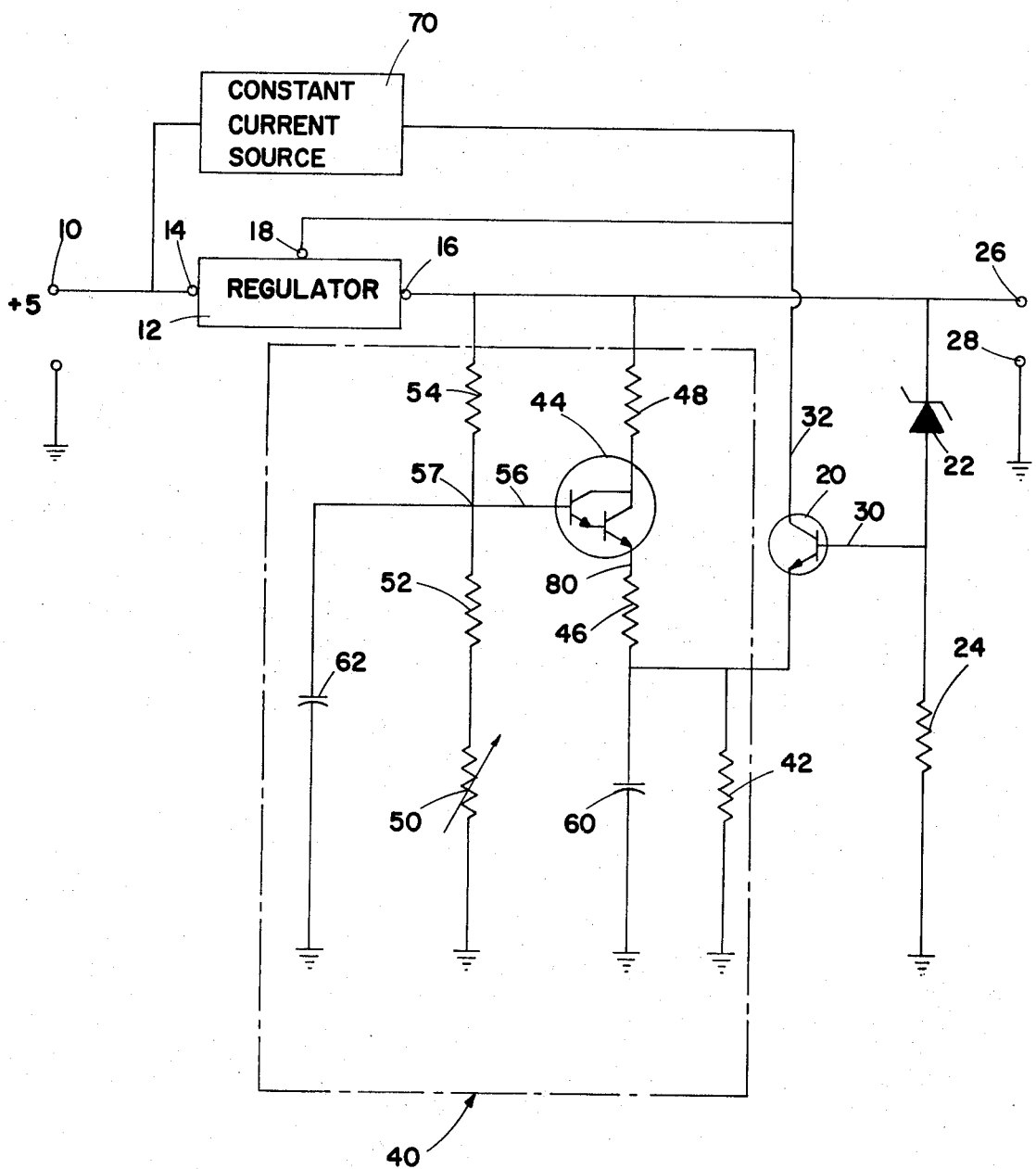
FIG. 1 is a simplified schematic and block diagram illustrating the preferred embodiment of the invention

In describing the preferred embodiment of the invention illustrated in the drawings, specific terminology will be resorted to for the sake of clarity. However, it is not in tended to be limited to the specific terms so selected and it is to be understood that each specific term includes all technical equivalents which operate in a similar manner to accomplish a similar purpose. For example, the terms "connected" or "connection" are not to be limited to direct connection but may include connection through other elements where the interposition of such elements is well known in the art.

DETAILED DESCRIPTION

Referring to FIG. 1, an unregulated dc supply is connected at an input 10 to a regulator element 12 indicated in block diagram form. The regulator element 12 contains regulator circuitry, such as well known in the art, for varying the conductance between its input 14 and its output 16. The conductance of the regulator 12 is controlled by the voltage applied at its input 18 from a feedback transistor 20. A series zener diode 22 and first resistance 24 are shunted across the regulated output terminals 26 and 28.

The regulator feedback transistor 20 has its input control terminal, which in the common emitter configuration is its base 30 connected between the zener diode 22 and the first resistance 24.

As is well known in regulator technology, changes in voltage in the regulated output 26 will appear across the first resistance 24. Small changes at the regulated output 26 will thus produce corresponding amplified voltage changes at the collector 32 of the feedback transistor 30. These changes at the collector 32 are applied to the input 18 of the regulator 12 to modify or change the conductance of the regulator element 12. Thus, a familiar feedback loop is formed through the feedback transistor 20 and, using well known negative feedback principles, the output voltage at the regulated output terminals 26 and 28 is stabilized or regulated.

The circuitry described immediately above is known in the prior art. A difficulty arises with such circuitry however because of the changes in the characteristics of the semiconductor devices due to temperature changes. Most importantly, problems arise because of the changes in the zener diode 22 and the feedback transistor 20. More specifically, the characteristic zener voltage of the diode 22 for diodes below 6 volts will decrease as the temperature of the circuit increases. Similarly, the voltage across the base-emitter junction of the feedback transistor 20 will be reduced as the temperature of the circuitry increases.

Unless such temperature-induced variations are compensated for by cancelling their effect, they will shift the voltage level applied at the input 18 of the regulator 12 and cause a change in regulator conductance. Temperature induced changes in regulator conductance are to be avoided because they will cause a voltage shift at the regulated output 26. Therefore, in an attempt to make the regulator solely output voltage responsive and not temperature responsive, a temperature compensation circuit is connected to the regulator and indicated generally as the compensation circuit 40.

The temperature compensation circuit 40 includes a voltage reference resistance 42 connected between the emitter of the feedback transistor 20 and ground to which the end of the first resistance 24 opposite the zener diode 22 is also connected. A darlington pair transistor 44 is connected by a resistance 46 to the reference resistance 42 and through a resistance 48 to the regulated power supply terminal 26. The Darlington transistor 44 supplies a temperature responsive current through the reference resistance 42. Although a Darlington pair is illustrated, it should be understood that a plurality of Darlington connected transistors may be used.

The resistance 46 together with the reference resistance 42 forms a voltage divider which applies across the reference resistance 42 a fixed proportion of voltage level changes which occur at the emitter 80 of the Darlington pair. The resistance 48 serves to minimize any power dissipation variations in the darlington pair as the current through it varys so that it will be sensitive only to ambient temperature changes.

A plurality of series connected voltage dividing resistances 50, 52, and 54 are connected across the regulated supply between terminals 26 and 28. The input terminal 56 of the Darlington pair transistor 44 is connected to a node 57 of the voltage dividing resistances 50, 52, and 54. These voltage dividing resistances maintain a constant input voltage on the Darlington transistor 44.

A first capacitor 60 is shunted across the reference resistance 42 for minimizing the response of the circuit to ac variations. For similar reasons, a second capacitance 62 is connected between the Darlington input 56 and the grounded output terminal 28. These capacitances make the temperature compensation circuit insensitive to ordinary ac variations, noise and ripple while permitting response to long-time variations in temperature.

Voltage divider resistance 50 is preferably variable for adjusting the output voltage of the regulated power supply. Advantageously, the collector 32 of the feedback transistor 20 is connected to a constant current generator formed by a high impedance element 70 connected to the unregulated input 10. The constant current generator eliminates $h_{re}$ feedback to the input 30 of the feedback transistor 20.

In the normal operation of the regulator illustrated in FIG. 1, the feedback transistor 20, in effect, looks for changes of voltage between the first resistance 24 and the reference resistance 42. A decrease of the regulated voltage at the terminal 26 will appear entirely between the anode of the zener diode 22 and ground 28. Such a decrease will reduce the base current of the feedback transistor 20 thereby raising its collector voltage to modify the regulator 12. The regulator 12 will increase its conductance to maintain the constant output voltage at the terminal 26. This operation, of course, assumes no temperature variations and no consequent changes in the operating characteristics of the semiconductor devices.

Similarly, an increase of the regulated voltage at the output terminal 26 will appear entirely between the anode of the zener diode 22 and ground. Such an increase will increase the base current of the feedback transistor 20 thereby reducing its collector voltage. The reduction of collector voltage will shift the regulator 12 in the opposite direction to decrease its conductance and thereby maintain the regulated output at a constant value. Again, such operation of course assumes no temperature variations in the circuitry. Because the feedback transistor is supplied by a constant current source 70 the voltage across the reference resistance 42 can not change or vary as a result of variations in the voltage of the regulated output terminal 26. It can change only by variations of emitter current in the Darlington transistor 44.

When the effects of temperature variations on the circuitry are considered, it becomes apparent that temperature increases cause the zener voltage of the diode 22 to be reduced for a diode operating below 6 volts. Similarly, the voltage of the base-emitter junction of the transistor 20 will be reduced. If the voltage across the reference resistance 42 were to remain constant as the temperature increased, these changes in the characteristics of the diode 22 and the feedback transistor 20 would cause changes in the collector voltage of the feedback transistor 20 in spite of the facts that the regulated output voltage at terminals 26 and 28 were to be unchanged. This temperature induced change of collector voltage would be fed back into the regulator at its input 18 and appear to the regulator 12 as a change in output voltage. Thus, the temperature induced changes would change the conductance of the regulator 12 and cause a shift in the output at the regulated output terminals 26 and 28.

We have discovered that the effects of such variations on the zener diode 22 and the feedback transistor 20 can be cancelled by increasing the voltage across the reference resistance 42 by an amount equal to the sum of the voltage reduction of the diode 22 and voltage reduction of the emitter-base junction of the transistor 20. We have found that the reference voltage level at the emitter of the transistor 20, that is, the voltage reference for the transistor 20 can be raised in amount equal to temperature induced changes at the input of the transistor 20 and its own emitter base junction so that the transistor 20 will see no net temperature induced change and therefore will not change its collector voltage 32 in response to temperature changes.

In the preferred embodiment illustrated in FIG. 1, any temperature increase will be accompanied by increased current through the emitter of the darlington pair 44 and its resistance 46. This current increase through the darlington pair 44 will result because, while the voltage level of its base 56 is fixed relative to the regulated output 26, any temperature increase will cause a voltage reduction across its base-emitter junctions which will result in an increase in its collector current. The collector current increase in turn will increase the voltage across the reference resistance 42 to raise the voltage level at the emitter of the feedback transistor 20.

Conversely, of course, temperature reductions cause a reduction of current flow through the darlington transistor 44 and cause a compensating reduction of voltage across the reference resistance 42.

For a given temperature rise, the emitter 80 of the darlington pair transistor 44 will ordinarily rise in voltage somewhat more than the sum of the reduction in voltage of the zener diode 22 and the base-emitter junction of the feedback transistor 20. Therefore, the resistance 46 is added to form a voltage divider with the reference resistance 42. The voltage across the reference resistance 42 will therefore be raised or lowered in an amount exactly equal to the sum of the voltage rises or reductions in the diode 22 and in the transistor 20.

The value of the resistance 48 is chosen so that the power dissipation in the darlington transistor 44 is maintained relatively constant. If this were not done, the darlington transistor would be sensitive not only to environmental temperature changes but to temperature changes induced by increases or decreases in its power dissipation. Therefore, the value of the resistance 48 is chosen so that the product of collector current and collector to emitter voltage remains relatively constant over its operating range. Thus, as the collector current of the Darlington pair transistor 44 increases due to a temperature increase, its emitter-collector voltage will decrease due to an increased drop across the resistance 48.

Adjustment of the variable resistance 50 will change the base current at the input 56 of the darlington pair and therefore change its collector current. Because changes in the collector current of the Darlington pair 44 result in changes in the voltage across the reference resistance 42, the variable resistance 50 may be used to control the regulated output voltage at the terminal 26.

FIG. 2 illustrates a schematic diagram of a regulator embodying the preferred embodiment of the invention. The details of the circuitry of the regulator 12 and the constant current generator 70 are illustrated. Additionally, the value of circuit elements are indicated for purposes of illustrating a typical embodiment of the invention. It may be noted that the collector 32 of the feedback transistor 20 is connected to the regulator input 18 by a diode connected Darlington transistor 86.

In an experiment utilizing a circuit substantially equivalent to that illustrated in FIG. 2, an experiment was conducted in which the output voltage at the terminal 26 and ground was measured and found to be 5.00 volts when the ambient temperature was 76°F. The circuit was then placed in a furnace unit and heated. The output voltage at the output terminal 26 was continuously monitored and found to be 4.99 volts at 165°F.

Therefore, it will be seen that we have provided a temperature compensation circuit which provides considerably improved temperature compensation and voltage stability at higher temperatures.

It is to be understood that while the detailed drawings and specific examples given describe preferred embodiment of the invention, they are for the purposes of illustration only, that the apparatus of the invention is not limited to the precise details and conditions disclosed and that various changes may be made therein without departing from the spirit of the invention which is defined by the following claims:

I claim:

1. A temperature compensation circuit for use in a regulated power supply of the type having a series zener diode and first resistance shunted across its regulated output and having a regulator feedback transistor with its input control terminal connected between said zener diode and said first resistance, said circuit comprising:
   a. voltage reference resistance connected between an output of said feedback transistor and the end of said first resistance opposite said zener diode;
   b. a plurality of darlington connected transistors having their outputs connected to said reference resistance and said regulated power supply for supplying a controlled current through the reference resistance; and
   c. a plurality of series connected voltage dividing resistances connected across said regulated supply having the input terminal of said darlington connected transistors connected to a node thereof.

2. A circuit according to claim 1 wherein said feedback transistor has a base as its control input, and the reference resistor is connected to an emitter of said feedback transistor.

3. A circuit according to claim 2 wherein said darlington connected transistors comprise a darlington pair having its base input connected to said voltage dividing resistances, having a second resistance connecting its emitter output to said reference resistance for forming a voltage divider and having a third resistance connecting its collector output to the regulated power supply output terminal for minimizing power dissipation variations in said darlington pair.

4. A circuit according to claim 3 wherein a first capacitor is shunted across said reference resistance for minimizing the response of said circuit to ac variations.

5. A circuit according to claim 4 wherein a second capacitance is connected between said darlington pair input and said opposite side of said first resistance.

6. A circuit according to claim 3 wherein said voltage dividing resistances include a manually variable resistance for adjusting the output voltage of said regulated power supply.

7. A circuit according to claim 3 wherein the collector of said feedback transistor is connected to a constant current generator.

* * * * *